(12) United States Patent
Choi et al.

(10) Patent No.: US 11,615,317 B2
(45) Date of Patent: Mar. 28, 2023

(54) METHOD AND APPARATUS FOR LEARNING STOCHASTIC INFERENCE MODELS BETWEEN MULTIPLE RANDOM VARIABLES WITH UNPAIRED DATA

(71) Applicant: Samsung Electronics Co., Ltd., Suwon-si (KR)

(72) Inventors: Yoo Jin Choi, San Diego, CA (US); Jongha Ryu, La Jolla, CA (US); Mostafa El-Khamy, San Diego, CA (US); Jungwon Lee, San Diego, CA (US); Young-Han Kim, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 16/886,429

(22) Filed: May 28, 2020

(65) Prior Publication Data

US 2021/0319326 A1     Oct. 14, 2021

Related U.S. Application Data

(60) Provisional application No. 63/008,294, filed on Apr. 10, 2020.

(51) Int. Cl.
| | | |
|---|---|---|
| *G06N 20/20* | (2019.01) | |
| *G06N 3/088* | (2023.01) | |
| *G06N 3/04* | (2023.01) | |

(52) U.S. Cl.
CPC .......... *G06N 3/088* (2013.01); *G06N 3/0454* (2013.01); *G06N 3/0472* (2013.01)

(58) Field of Classification Search
CPC ...... G06N 3/088; G06N 3/0444; G06N 3/084; G06N 20/20; G06T 9/002

(Continued)

(56) References Cited

U.S. PATENT DOCUMENTS 11,030,526 B1 *   6/2021   Goodsitt ............ G06N 3/0454
2017/0161635 A1   6/2017   Oono et al.
(Continued)

FOREIGN PATENT DOCUMENTS

| WO | WO 2018/211143 A1 | 11/2018 |
|---|---|---|
| WO | WO 2019/068837 A1 | 4/2019 |
| WO | WO 2019/157228 A1 | 8/2019 |

OTHER PUBLICATIONS

Alemi, A.A. et al., "Deep Variational Information Bottleneck", ICLR, Oct. 23, 2019, pp. 1-19, arXiv:1612.00410v7.

(Continued)

*Primary Examiner* — Gordon G Liu
(74) *Attorney, Agent, or Firm* — Lewis Roca Rothgerber Christie LLP

(57) ABSTRACT

A system and method for operating a neural network. In some embodiments, the neural network includes a variational autoencoder, and the training of the neural network includes training the variational autoencoder with a plurality of samples of a first random variable; and a plurality of samples of a second random variable, the plurality of samples of the first random variable and the plurality of samples of the second random variable being unpaired, the training of the neural network including updating weights in the neural network based on a first loss function, the first loss function being based on a measure of deviation from consistency between: a conditional generation path from the first random variable to the second random variable, and a conditional generation path from the second random variable to the first random variable.

20 Claims, 14 Drawing Sheets

(58) Field of Classification Search
USPC .......................................................... 706/25
See application file for complete search history.

(56) References Cited

U.S. PATENT DOCUMENTS

| | | | |
|---|---|---|---|
| 2018/0165554 A1 | 6/2018 | Zhang et al. | |
| 2019/0018933 A1* | 1/2019 | Oono | G06N 7/08 |
| 2019/0026631 A1 | 1/2019 | Carr et al. | |
| 2019/0324988 A1 | 10/2019 | Wayne et al. | |
| 2020/0134499 A1* | 4/2020 | Ryu | G06N 20/00 |
| 2020/0349447 A1* | 11/2020 | Zhong | G06N 3/0472 |

OTHER PUBLICATIONS

Bengio, Y. et al., "Representation Learning: A Review and New Perspectives", Apr. 23, 2014, pp. 1-30, arXiv:1206.5538v3.
Blei, D.M. et al., "Variational Inference: A Review for Statisticians", May 9, 2018, pp. 1-41, arXiv:1601.00670v9.
Cover, T.M. et al., "Elements of Information Theory, $2^{nd}$ Edition", 2006, pp. 22-25, Wiley.
Cuff, P., "Distributed Channel Synthesis", Aug. 20, 2013, pp. 1-26, arXiv:1208.4415v3.
Damianou, A.C. et al., "Manifold Relevance Determination", Proceedings of the $29^{th}$ International Conference on Machine Learning, 2012, 8 pages.
Doersch, C., "Tutorial on Variational Autoencoders", Aug. 13, 2016, pp. 1-23, arXiv:1606.05908v2.
Donahue, J. et al., "Adversarial Feature Learning", ICLR 2017, Apr. 3, 2017, pp. 1-18, arXiv:1605.09782v7.
Dumoulin, V. et al., "Adversarially Learned Inference", ICLR 2017, Feb. 21, 2017, pp. 1-18, arXiv:1606.00704v3.
Ek, C.H. et al., "Ambiguity Modeling in Latent Spaces", International Workshop Machine Learning Multimodal Interaction, 2008, 12 pages.
El Gamal, A. et al., "Network Information Theory", 2011, p. 347, Cambridge University Press.
Frans, K., "Variational Autoencoders Explained", Aug. 6, 2016, 8 pages, http://kvfrans.com/variational-autoencoders-explained/.
Gonzalez-Garcia, A. et al., "Image-to-image translation for cross-domain disentanglement", $32^{nd}$ Conference on Neural Information Processing Systems (NIPS 2018), Montréal, Canada, Nov. 4, 2018, pp. 1-12, arXiv:1805.09730v3.
Goodfellow, I.J., "Generative Adversarial Nets", Advances in Neural Information Processing Systems, 2014, pp. 1-9.
Higgins, I. et al., "β-VAE: Learning Basic Visual Concepts With A Constrained Variational Framework", ICLR 2017, pp. 1-22.
Huang, X. et al., "Multimodal Unsupervised Image-to-Image Translation", Aug. 14, 2018, pp. 1-23, arXiv:1804.04732v2.
Huang, X. et al., "Multimodal Unsupervised Image-to-Image Translation", ECCV 2018, 18 pages, ECCV LNCS, https://link.springer.com/conference/eccv.
Jha, A.H. et al., "Disentangling Factors of Variation with Cycle-Consistent Variational Auto-Encoders", 2018, pp. 1-16, ECCV LNCS, https://link.springer.com/conference/eccv.
Kingma, D.P. et al., "ADAM: A Method for Stochastic Optimization", ICLR 2015, Jan. 30, 2017, pp. 1-15, arXiv:1412.6980v9.
Kingma, D.P. et al., "Auto-Encoding Variational Bayes", May 1, 2014, pp. 1-14, arXiv:1312.6114v10.
Kingma, D.P. et al., "Semi-supervised Learning with Deep Generative Models", Oct. 31, 2014, pp. 1-9, arXiv:1406.5298v2, http://arxiv.org/abs/1406.5298.
Kuznetsova, R., "Variational Bi-domain Triplet Autoencoder", KDD 2018 Deep Learning Day, Aug. 2018, 6 pages.
Lecun, Y. et al., "Gradient-Based Learning Applied to Document Recognition", Proceedings of the IEEE, Nov. 1998, pp. 2278-2324, vol. 86, No. 11, IEEE.
Lecun, Y. et al., "The MNIST Database of handwritten digits", 8 pages, http://yann.lecun.com/exdb/mnist/.
Liu, Z. et al., "Deep Learning Face Attributes in the Wild", International Conference on Computer Vision, 2015, pp. 3730-3738, IEEE Xplore.
Maaløe, L. et al., "Auxiliary Deep Generative Models", Proceedings of the $33^{rd}$ International Conference on Machine Learning, 2016, 9 pages, vol. 48, JMLR: W&CP.
Makhzani, A. et al., "Adversarial Autoencoders", May 25, 2016, pp. 1-16, arXiv:1511.05644v2.
Makhzani, A., "Implicit Autoencoders", Feb. 7, 2019, pp. 1-15, arXiv:1805.09804v2.
Mescheder, L. et al., "Adversarial Variational Bayes: Unifying Variational Autoencoders and Generative Adversarial Networks", Jun. 11, 2018, 14 pages, arXiv:1701.04722v4.
Netzer, Y. et al., "Reading Digits in Natural Images with Unsupervised Feature Learning", NIPS Workshop on Deep Learning and Unsupervised Feature Learning, 2011, pp. 1-9.
Nguyen, X. et al., "Estimating Divergence Functionals and the Likelihood Ratio by Convex Risk Minimization", IEEE Transactions on Information Theory, Nov. 2010, pp. 5847-5861, vol. 56, No. 11, IEEE.
Neilsen, F. et al., "On the Chi Square and Higher-Order Chi Distances for Approximating $f$-Divergences", IEEE Signal Processing Letters, Jan. 2014, pp. 10-13, vol. 21, No. 1, IEEE.
Nowozin, S. et al., "$f$-GAN: Training Generative Neural Samplers using Variational Divergence Minimization", $30^{th}$ Conference on Neural Information Processing Systems (NIPS 2016), Barcelona, Spain, pp. 1-9.
Pu, Y. et al., "Adversarial Symmetric Variational Autoencoder", $31^{st}$ Conference on Neural Information Processing Systems (NIPS 2017), Long Beach, CA, USA, pp. 1-10.
Radford, A. et al., "Unsupervised Representation Learning With Deep Convolutional Generative Adversarial Networks", ICLR, Jan. 7, 2016, pp. 1-16, arXiv:1511.06434v2.
Rezende, D.J. et al., "Stochastic Backpropagation and Approximate Inference in Deep Generative Models", Proceedings of the $31^{st}$ International Conference on Machine Learning, 2014, Beijing, China, 9 pages, vol. 32, JMLR: W&CP.
Rezende, D.J. et al., "Variational Inference with Normalizing Flows", Proceedings of the $32^{nd}$ International Conference on Machine Learning, 2015, Lille, France, 9 pages, vol. 37, JMLR: W&CP.
Rubinstein, R.Y. et al., "Simulation and the Monte Carlo method", 2016, 1 page, vol. 10, John Wiley & Sons.
Ryu, J.J. et al., "Variational Inference via a Joint Latent Variable Model with Common Information Extraction", Third Workshop on Bayesian Deep Learning (NeurIPS 2018), Montréal, Canada, 2018, pp. 1-8.
Ryu, J.J. et al., "Wyner VAE: Joint and Conditional Generation with Succinct Common Representation Learning", May 27, 2019, pp. 1-24, arXiv:1905.10945v1.
Salzmann, M. et al., "Factorized Orthogonal Latent Spaces", Proceedings of the $13^{th}$ International Conference on Artificial Intelligence and Statistics, 2010, Sardinia, Italy, pp. 701-708, vol. 9, JMLR: W&CP.
Shafkat, I., "Intuitively Understanding Variational Autoencoders", Feb. 4, 2018, 17 pages.
Shon, A.P. et al., "Learning Shared Latent Structure for Image Synthesis and Robotic Imitation", Advances in Neural Information Processing Systems, 2006, 8 pages.
Shu, R. et al., "Bottleneck Conditional Density Estimation", Jun. 30, 2017, 11 pages. arXiv:1611.08568v3.
Sohn, K. et al., "Learning Structured Output Representation using Deep Conditional Generative Models", Advances in Neural Information Processing Systems, 2015, pp. 1-9.
Suzuki, M. et al., "Joint Multimodal Learning with Deep Generative Models", ICLR 2017, Nov. 7, 2016, pp. 1-12, arXiv:1611.01891v1.
Tiao, L.C. et al., "Cycle-Consistent Adversarial Learning as Approximate Bayesian Inference", ICML 2018 Workshop on Theoretical Foundations and Applications of Deep Generative Models, Stockholm, Sweden, Aug. 24, 2018, 17 pages, arXiv:1806.01771v3.
Tishby, N. et al., "The Information Bottleneck Method", Proc. $37^{th}$ Annual Allerton Conference Comm. Control Comput., 1999, pp. 1-11.

(56) References Cited

OTHER PUBLICATIONS

Vedantam, R. et al., "Generative Models of Visually Grounded Imagination", ICLR 2018, Nov. 9, 2018, pp. 1-21, arXiv:1705.10762v8.

Wang, W. et al., "Deep Variational Canonical Correlation Analysis", Feb. 25, 2017, 13 pages, arXiv:1610.03454v3.

Wyner, A.D., "The Common Information of Two Dependent Random Variables", IEEE Transactions of Information Theory, Mar. 1975, pp. 163-179, vol. IT-21, No. 2.

Xu, A. et al., "Information-theoretic analysis of generalization capability of learning algorithms", $31^{st}$ Conference on Neural Information Processing Systems (NIPS 2017), Long Beach, CA, USA, pp. 1-10.

Zhao, S. et al., "The Information Autoencoding Family: A Lagrangian Perspective on Latent Variable Generative Models", Proc. Uncertain. Artificial Intelligence, 2018, 11 pages.

Zhu, J-Y. et al., "Unpaired Image-to-Image Translation using Cycle-Consistent Adversarial Networks", Nov. 15, 2018, 18 pages, arXiv:1703.10593v6.

Zhu, J-Y. et al., "Unpaired Image-to-Image Translation using Cycle-Consistent Adversarial Networks", pp. 2223-2232, 2017, IEEE Xplore.

\* cited by examiner

METHOD AND APPARATUS FOR LEARNING STOCHASTIC INFERENCE MODELS BETWEEN MULTIPLE RANDOM VARIABLES WITH UNPAIRED DATA

CROSS-REFERENCE TO RELATED APPLICATION(S)

The present application claims priority to and the benefit of U.S. Provisional Application No. 63/008,294, filed Apr. 10, 2020, entitled "METHOD AND APPARATUS FOR LEARNING STOCHASTIC INFERENCE MODELS BETWEEN MULTIPLE RANDOM VARIABLES WITH UNPAIRED DATA", the entire content of which is incorporated herein by reference.

FIELD

One or more aspects of embodiments according to the present disclosure relate to machine learning, and more particularly to stochastic inference models between multiple random variables.

BACKGROUND

In various applications it may be advantageous for a machine learning system to perform conditional generation or joint generation. A machine learning model for performing these tasks may be trained using paired data. In some applications, however, paired data are not readily available and may be costly to generate.

Thus, there is a need for an improved system and method for learning stochastic inference models between multiple random variables with unpaired data.

SUMMARY

According to an embodiment of the present invention, there is provided a method for operating a neural network, the method including: training the neural network, wherein: the neural network includes a variational autoencoder, including: an encoder network configured: to receive a sample of a first random variable, and to produce a mean and a variance of each of: a first latent variable and a second latent variable, or to receive a sample of a second random variable, and to produce a mean and a variance of each of: the second latent variable and a third latent variable; and a decoder network configured: to receive a sample of the first latent variable and a sample of the second latent variable, and to generate a generated sample of the first random variable, or to receive a sample of the second latent variable and a sample of the third latent variable, and to generate a generated sample of the second random variable, the training of the neural network including training the variational autoencoder with: a plurality of samples of the first random variable; and a plurality of samples of the second random variable, the plurality of samples of a first random variable and the plurality of samples of the second random variable being unpaired, the training of the neural network including updating weights in the neural network based on a first loss function, the first loss function being based on a measure of deviation from consistency between: a conditional generation path from the first random variable to the second random variable, and a conditional generation path from the second random variable to the first random variable.

In some embodiments, the first loss function includes: a first term representing reconstruction loss of the first random variable; a second term representing deviations from consistency in the second latent variable; a third term representing deviations from consistency in the first latent variable; and a fourth term representing deviations from consistency in the third latent variable.

In some embodiments, the method further includes performing conditional generation, by the variational autoencoder, the performing of conditional generation including: receiving, by the encoder network, a sample of the first random variable; producing a mean and a variance of each of: the first latent variable and the second latent variable; receiving, by the decoder network, a sample of each of: a distribution having the produced mean and the produced variance of the first latent variable, a distribution having the produced mean and the produced variance of the second latent variable, and a distribution having the mean and the variance of a prior distribution of the third latent variable; and generating, by the decoder network, a generated sample of the second random variable.

In some embodiments, the method further includes performing joint generation, by the variational autoencoder, the performing of joint generation including: receiving, by the decoder network, a sample of each of: the first latent variable, the second latent variable, and the third latent variable; and generating, by the decoder network: a generated sample of the first random variable, based on the first latent variable and the second latent variable, a generated sample of the second random variable, based on the second latent variable and the third latent variable.

In some embodiments, the neural network further includes a discriminative neural network, and the training of the neural network further includes updating weights in the discriminative neural network based on a second loss function, the second loss function including an f-divergence.

In some embodiments, the training includes updating weights in the neural network based on a first loss function, the first loss function including: a first term representing reconstruction loss of the first random variable; a second term representing deviations from consistency in the second latent variable; a third term representing deviations from consistency in the first latent variable; and a fourth term representing deviations from consistency in the third latent variable.

In some embodiments, the first loss function further includes a fifth term based on the discriminative neural network.

In some embodiments, the method further includes performing conditional generation, by the variational autoencoder, the performing of conditional generation including: receiving, by the encoder network, a sample of the first random variable; producing a mean and a variance of each of: the first latent variable and the second latent variable; receiving, by the decoder network, a sample of each of: a distribution having the produced mean and the produced variance of the first latent variable, a distribution having the produced mean and the produced variance of the second latent variable, and a distribution having the mean and the variance of a prior distribution of the third latent variable; and generating, by the decoder network, a generated sample of the second random variable.

In some embodiments, the method further includes performing joint generation, by the variational autoencoder, the performing of joint generation including: receiving, by the decoder network, a sample of each of: the first latent variable, the second latent variable, and the third latent variable; and generating, by the decoder network: a generated sample of the first random variable, based on the first latent variable and the second latent variable, a generated sample of the second random variable, based on the second latent variable and the third latent variable.

According to an embodiment of the present invention, there is provided a system, including: a processing circuit, and a neural network, the processing circuit being configured to train the neural network, wherein: the neural network includes a variational autoencoder, including: an encoder network configured: to receive a sample of a first random variable, and to produce a mean and a variance of each of: a first latent variable and a second latent variable, or to receive a sample of a second random variable, and to produce a mean and a variance of each of: the second latent variable and a third latent variable; and a decoder network configured: to receive a sample of the first latent variable and a sample of the second latent variable, and to generate a generated sample of the first random variable, or to receive a sample of the second latent variable and a sample of the third latent variable, and to generate a generated sample of the second random variable, the training of the neural network including training the variational autoencoder with: a plurality of samples of the first random variable; and a plurality of samples of the second random variable, the plurality of samples of a first random variable and the plurality of samples of the second random variable being unpaired, the training of the neural network including updating weights in the neural network based on a first loss function, the first loss function being based on a measure of deviation from consistency between: a conditional generation path from the first random variable to the second random variable, and a conditional generation path from the second random variable to the first random variable.

In some embodiments, the first loss function includes: a first term representing reconstruction loss of the first random variable; a second term representing deviations from consistency in the second latent variable; a third term representing deviations from consistency in the first latent variable; and a fourth term representing deviations from consistency in the third latent variable.

In some embodiments, the processing circuit is configured to cause the variational autoencoder to perform conditional generation, the performing of conditional generation including: receiving, by the encoder network, a sample of the first random variable; producing a mean and a variance of each of: the first latent variable and the second latent variable; receiving, by the decoder network, a sample of each of: a distribution having the produced mean and the produced variance of the first latent variable, a distribution having the produced mean and the produced variance of the second latent variable, and a distribution having the mean and the variance of a prior distribution of the third latent variable; and generating, by the decoder network, a generated sample of the second random variable.

In some embodiments, the processing circuit is configured to cause the variational autoencoder to perform joint generation, the performing of joint generation including: receiving, by the decoder network, a sample of each of: the first latent variable, the second latent variable, and the third latent variable; and generating, by the decoder network: a generated sample of the first random variable, based on the first latent variable and the second latent variable, a generated sample of the second random variable, based on the second latent variable and the third latent variable.

In some embodiments, the neural network further includes a discriminative neural network, and the training of the neural network further includes updating weights in the discriminative neural network based on a second loss function, the second loss function including an f-divergence.

In some embodiments, the training includes updating weights in the neural network based on a first loss function, the first loss function including: a first term representing reconstruction loss of the first random variable; a second term representing deviations from consistency in the second latent variable; a third term representing deviations from consistency in the first latent variable; and a fourth term representing deviations from consistency in the third latent variable.

In some embodiments, the first loss function further includes a term based on the discriminative neural network.

In some embodiments, the processing circuit is configured to cause the variational autoencoder to perform conditional generation, the performing of conditional generation including: receiving, by the encoder network, a sample of the first random variable; producing a mean and a variance of each of: the first latent variable and the second latent variable; receiving, by the decoder network, a sample of each of: a distribution having the produced mean and the produced variance of the first latent variable, a distribution having the produced mean and the produced variance of the second latent variable, and a distribution having the mean and the variance of a prior distribution of the third latent variable; and generating, by the decoder network, a generated sample of the second random variable.

In some embodiments, the processing circuit is configured to cause the variational autoencoder to perform joint generation, the performing of joint generation including: receiving, by the decoder network, a sample of each of: the first latent variable, the second latent variable, and the third latent variable; and generating, by the decoder network: a generated sample of the first random variable, based on the first latent variable and the second latent variable, a generated sample of the second random variable, based on the second latent variable and the third latent variable.

According to an embodiment of the present invention, there is provided a system, including: means for processing, and a neural network, the means for processing being configured to train the neural network, wherein: the neural network includes a variational autoencoder, including: an encoder network configured: to receive a sample of a first random variable, and to produce a mean and a variance of each of: a first latent variable and a second latent variable, or to receive a sample of a second random variable, and to produce a mean and a variance of each of: the second latent variable and a third latent variable; and a decoder network configured: to receive a sample of the first latent variable and a sample of the second latent variable, and to generate a generated sample of the first random variable, or to receive a sample of the second latent variable and a sample of the third latent variable, and to generate a generated sample of the second random variable, the training of the neural network including training the variational autoencoder with: a plurality of samples of the first random variable; and a plurality of samples of the second random variable, the plurality of samples of a first random variable and the plurality of samples of the second random variable being unpaired, the training of the neural network including updating weights in the neural network based on a first loss function, the first loss function being based on a measure of deviation from consistency between: a conditional generation path from the first random variable to the second random variable, and a conditional generation path from the second random variable to the first random variable.

In some embodiments, the first loss function includes: a first term representing reconstruction loss of the first random variable; a second term representing deviations from consistency in the second latent variable; a third term representing deviations from consistency in the first latent variable; and a fourth term representing deviations from consistency in the third latent variable.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
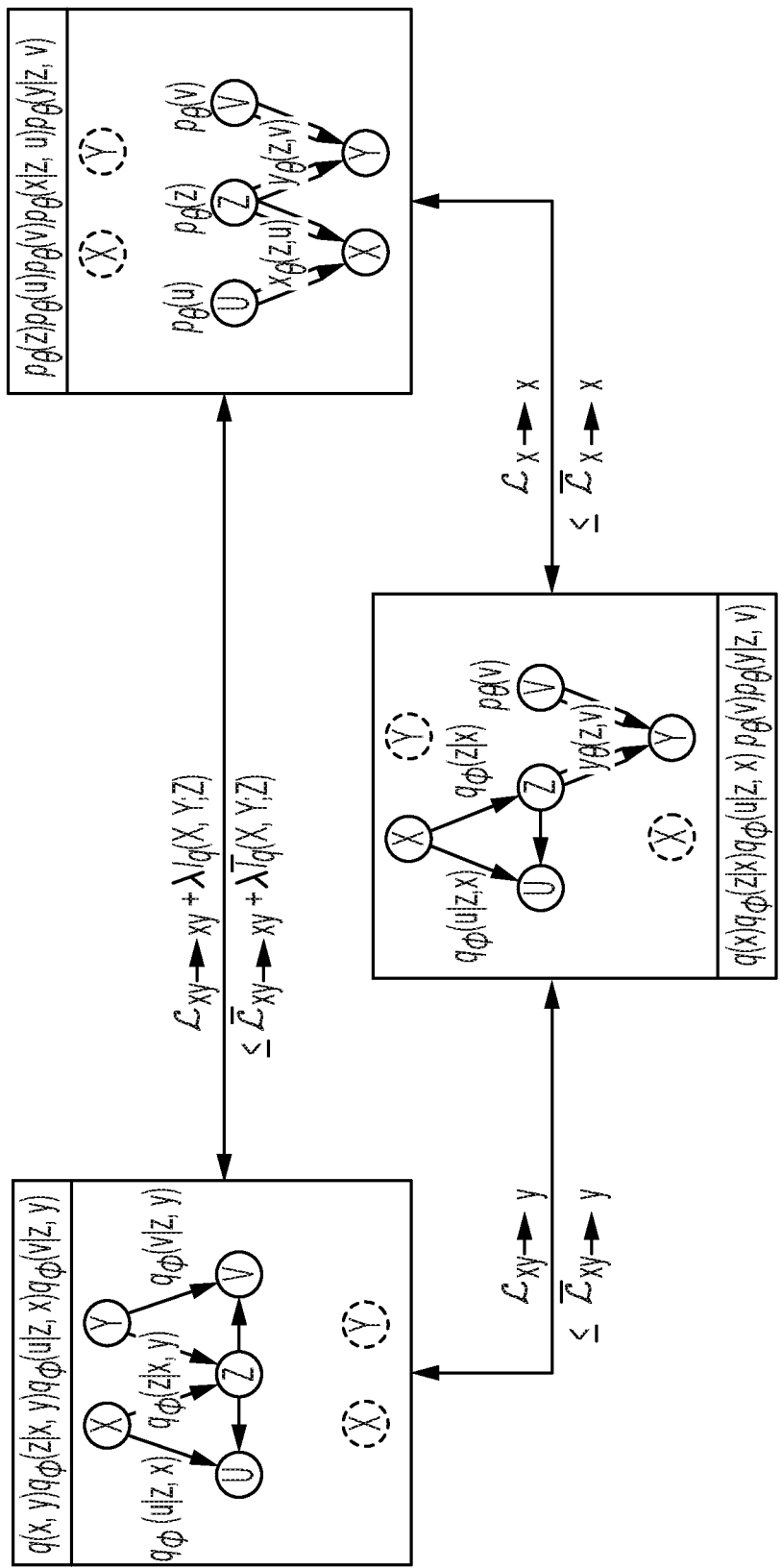
FIG. 1 is a relation diagram for a variational autoencoder, according to an embodiment of the present disclosure.

The detailed description set forth below in connection with the appended drawings is intended as a description of exemplary embodiments of a system and method for learning stochastic inference models between multiple random variables with unpaired data provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

As mentioned above, in various applications it may be useful to generate samples (referred to herein as "generated samples") from distributions that approximate the distributions of two random variables, i.e., the marginal distribution of each of the two random variables, the conditional distribution of one random variable given the other random variable, and the joint distribution of the two random variables. Each of the random variables may be a high-dimensional random vector, e.g., an image. For example, in one embodiment, a neural network may be trained with photographs and images of corresponding paintings (e.g., a photograph of a person or a landscape, and an image of a painting of the same person or landscape). The neural network may then be capable of performing conditional generation, e.g., given a photograph (e.g., a photograph of a person not in the training set) it may be capable of generating an image of a corresponding painting. A neural network trained in an analogous manner may also be capable of performing joint generation (e.g., after being trained with images and captions, the neural network may be capable of generating images each with a corresponding caption). Within the present disclosure, a first portion, below, discusses the operation of a neural network (e.g., of a variational autoencoder) when paired data (e.g., pairs of vectors (X,Y), e.g., pairs of images, a first image of each pair being a photograph, and a second image of each pair being an image of a corresponding painting) are available. A second portion of the present disclosure, below the first portion, discusses the operation of a neural network when paired data are not available, or when only a small set of paired data is available. As used herein, "operating" a neural network includes all activities in which a neural network may be engaged, including, for example, training, generating, and discriminating.

For two random variables X and Y, two joint distributions may be defined for joint and conditional generation tasks (using the notation $p_\theta$ for generation and $q_\phi$ for inference) as follows:

$$p_\theta(z,u,v,x,y) = p_\theta(z)p_\theta(u)p_\theta(v)p_\theta(x|z,u)p_\theta(y|z,v)$$

and $$q_\phi(z,u,v,x,y) = q_{data}(x,y)q_\phi(z|x,y)q_\phi(u|z,x)q_\phi(v|z,y),$$

where $q_{data}(x,y)$ is the joint distribution of the training data. Then, the following three distribution matching terms and one mutual information term may be used to train $p_\theta(z)$, $p_\theta(u)$, $p_\theta(v)$, $p_\theta(x|z,u)$, $p_\theta(y|z, v), q_\phi(z|x), q_\phi(u|z,x), q_\phi(v|z,y)$:

1. Joint distribution matching for paired data $L_{xy \to xy}$ $$\mathcal{L}_{xy \to xy} =$$
$$D_{KL}(q(x, y)q_\phi(z \mid x, y) \| p_\theta(z)\tilde{p}_\theta(x \mid z)\tilde{p}_\theta(y \mid z)) \le D_{KL}(\eta(x, y)q_\phi(z \mid x, y)$$
$$q_\phi(u \mid z, x)q_\phi(v \mid z, y) \| p_\theta(z)\tilde{p}_\theta(x \mid z)\tilde{p}_\theta(y \mid z)\tilde{p}_\theta(u, v \mid x, y, z)) =$$
$$D_{KL}(q(x, y)q_\phi(z \mid x, y)q_\phi(u \mid z, x)q_\phi(v \mid z, y) \| p_\theta(z)p_\theta(u)$$
$$p_\theta(v)p_\theta(x \mid z, u)p_\theta(y \mid z, v)) = : \overline{\mathcal{L}}_{xy \to xy},$$

2. Joint distribution matching for paired data $L_{xy \to x}$:

$$\mathcal{L}_{xy \to x} \le \overline{\mathcal{L}}_{xy \to x} \triangleq D_{KL}(q(x,y)q_\phi(z|x,y)q_\phi(v|z,y) \| q(x)q_\phi(z|x)p_\theta(v)p_\theta(y|z,v)).$$

3. Marginal distribution matching $L_{x \to x}$:

$$\mathcal{L}_{x \to x} \leq \overline{\mathcal{L}}_{x \to x} \triangleq D_{KL}(q(x)q_\phi(z|x)q_\phi(u|z,x)\|p_\theta(z)p_\theta(u) \\ p_\theta(z|z,u)).$$

4. Mutual Information $I_q$ between (X,Y) and Z:

$$I_q = \mathbb{E}_{q(x,y)}[D_{KL}(q_\phi(z|X,Y)\|q_\phi(z))] \leq \mathbb{E}_{q(x,y)}[D_{KL}(q_\phi(z|X,Y)\|p_\theta(z))] =: \overline{I}_q$$

Referring to FIG. 1, the final objective is the weighted sum of all terms above as follows:

$$\mathcal{L} \triangleq \mathcal{L}_{xy \to xy} + \lambda I_q + \alpha_{x \to x}\mathcal{L}_{x \to y} + \alpha_{xy \to y}\mathcal{L}_{xy \to y} + \alpha_{y \to y}\mathcal{L}_{y \to y} + \alpha_{xy \to x}\mathcal{L}_{xy \to x}.$$

This approach uses paired data (X,Y) for training the joint model, in particular for computing the loss terms $L_{xy \to xy}$, $L_{xy \to x}$, $L_{xy \to y}$, $I_q$.

After training a generative model, to perform joint generation, z,u,v may be sampled from $p_\theta(z)$, $p_\theta(u)$, $p_\theta(v)$, and, given sampled z, u, v, values of x, y may be jointly generated from $p_\theta(x|z,u)p_\theta(y|z,v)$. As used herein, "sampling" means generating a value using one or more pseudorandom number generators configured to generate values according to the appropriate distribution. For conditional generation, $q_\phi(z|x)$ may be used to get a sample of z given x and a sample of v may be generated from $p_\theta(v)$, respectively. Using sampled z, v, a value of y conditioned on x can be generated from $p_\theta(y|z, v)$.

Figure 2A:
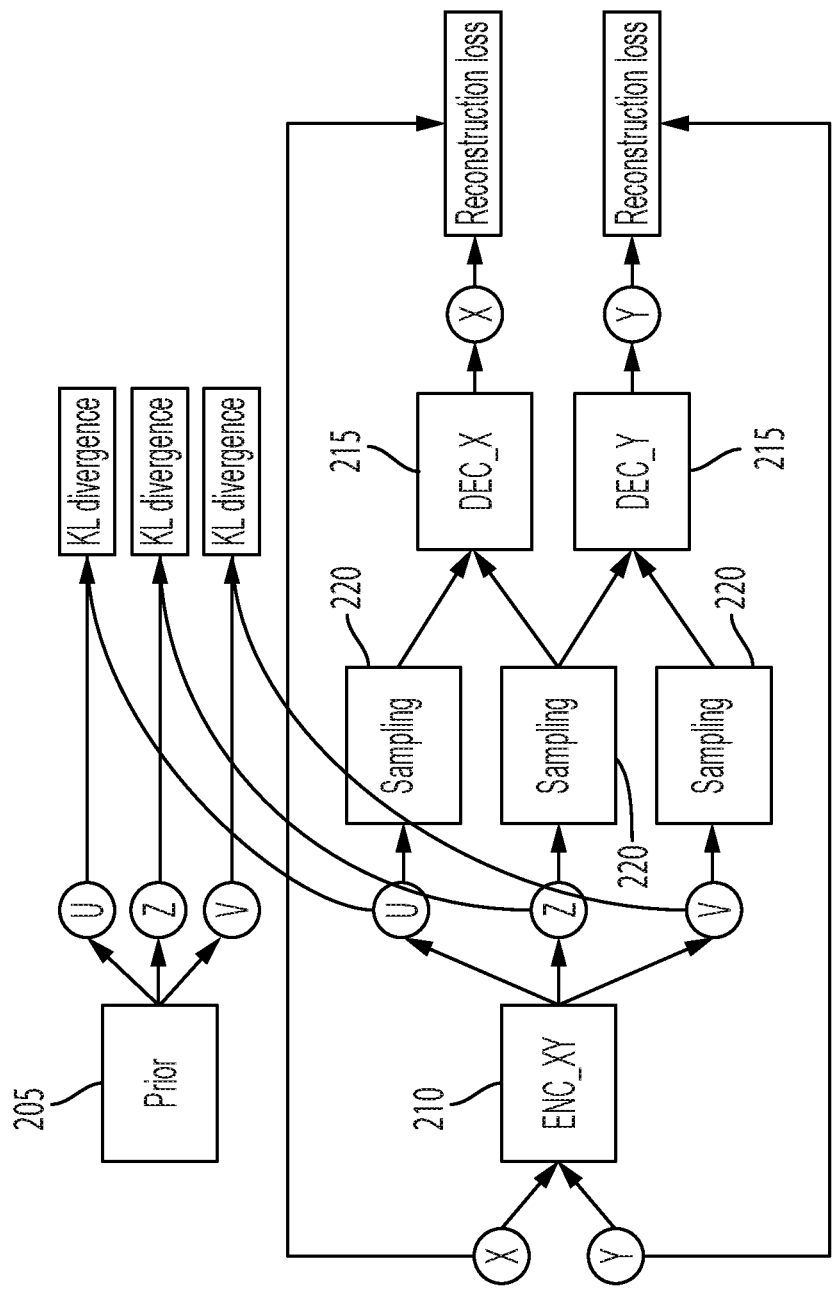
FIG. 2A is a block diagram showing a portion of the training of a variational autoencoder, according to an embodiment of the present disclosure.

FIG. 2A depicts how the joint loss $L_{xy \to xy}$ may be computed when paired data are available. In FIG. 2A, the "Prior" block 205 represents a network that yields prior distributions of z,u,v, i.e., $p_\theta(z)p_\theta(u)p_\theta(v)$, the ENC_XY block is an encoder network 210 that yields $q_\phi(z|x,y)q_\phi(u|z,x)q_\phi(v|z,y)$, the DEC_X block is a decoder network 215 that yields $p_\theta(x|z,u)$, the DEC_Y block is a decoder network 215 that yields $p_\theta(y|z,v)$, and the sampling blocks 220 generate one sample at a time from given distributions.

Figure 2B:
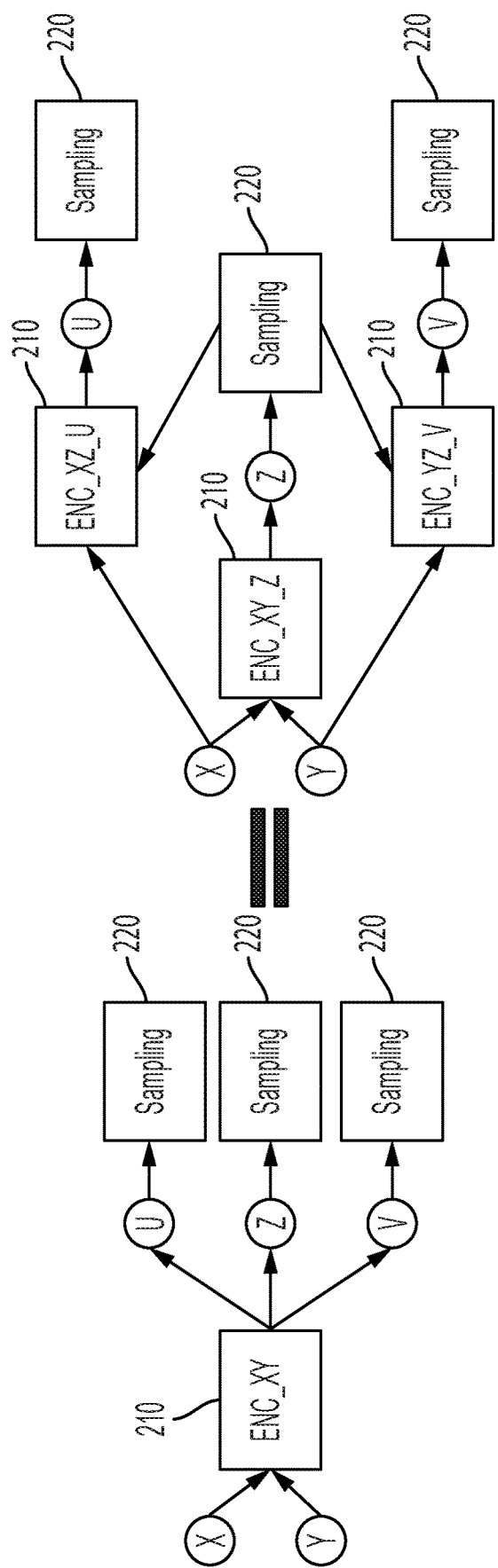
FIG. 2B is a block diagram showing the structure of an encoder, according to an embodiment of the present disclosure.
Figure 2C:
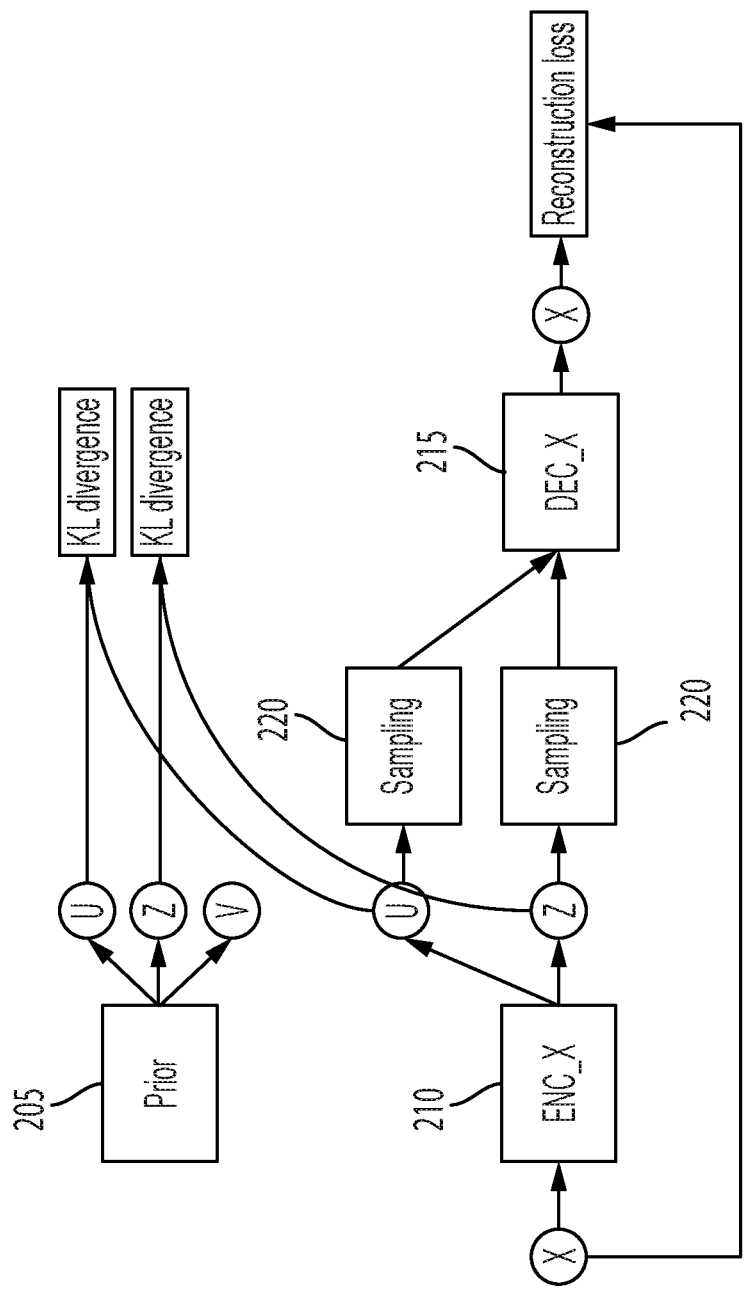
FIG. 2C is a block diagram showing a portion of the training of a variational autoencoder, according to an embodiment of the present disclosure.
Figure 2D:
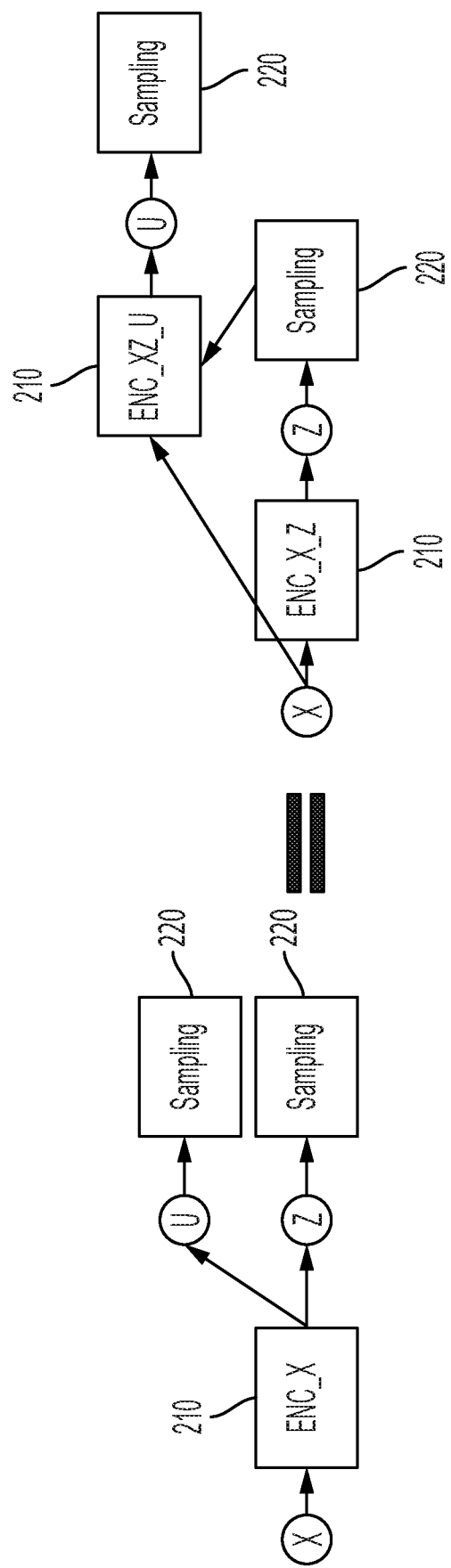
FIG. 2D is a block diagram showing the structure of an encoder, according to an embodiment of the present disclosure.

Assuming Gaussian parameterization, each network yields the mean and the variance of Gaussian distribution. In this example, sampling has the effect of generating one realization from a given Gaussian distribution (e.g., the sampling block 220 after Z samples one realization of Z from $q_\phi(z|x,y)$). The joint encoder may be implemented as shown in FIG. 2B, where ENC_XY consists of ENC_XY_Z, ENC_ZX_U and ENC_YZ_V; ENC_XY_Z represents the encoder network 210 that yields $q_\phi(z|x,y)$ given x,y; ENC_XZ_U represents the encoder network 210 that yields $q_\phi(u|z,x)$ given z, x; and ENC_YZ_V represents the encoder network 210 that yields $q_\phi(v|z,y)$ given z,y. FIG. 2C depicts how the marginal loss $L_{x \to x}$ is computed, in some embodiments. The marginal encoder may be implemented as shown in FIG. 2D, where ENC_XZ_U may be shared with the joint encoder of FIG. 2B.

As mentioned above, a second portion of the present disclosure, which follows, discusses the operation of a neural network (e.g., a neural network including a variational autoencoder) when paired data are not available, or when only a small set of paired data is available. This second portion includes a method for using unpaired data to help train the variational autoencoder. Given two random variables of interest X and Y, three latent variables Z,U,V may be introduced; from these X and Y may be generated jointly from $p_\theta(x|z,u), p_\theta(y|z,v)$. In the first portion of the disclosure, above, joint distributions defined by $$p_\theta(z,u,v,x,y) = p_\theta(z)p_\theta(u)p_\theta(v)p_\theta(x|z,u)p_\theta(y|z,v) \text{ and}$$

$$q_\phi(z,u,v,x,y) = q_{data}(x,y)q_\phi(z|x,y)q_\phi(u|z,x)q_\phi(v|z,y) \text{ are matched.}$$

In some embodiments, in addition to these two joint distributions, $p_\theta$ and $q_\phi$ are combined in different ways to define a joint distribution of Z,U,V,X,Y as follows:

$$p_{\phi,\theta}^{x \to y}(z,u,v,x,y) = q_{data}(x)q_\phi(z|x)p_\theta(u|z,x)p_\theta(v) \\ p_\theta(y|z,v)$$

and $$p_{\phi,\theta}^{y \to x}(z,u,v,x,y) = q_{data}(y)q_\phi(z|y)p_\theta(v|z,y)p_\theta(u) \\ p_\theta(x|z,u)$$

Figure 3:
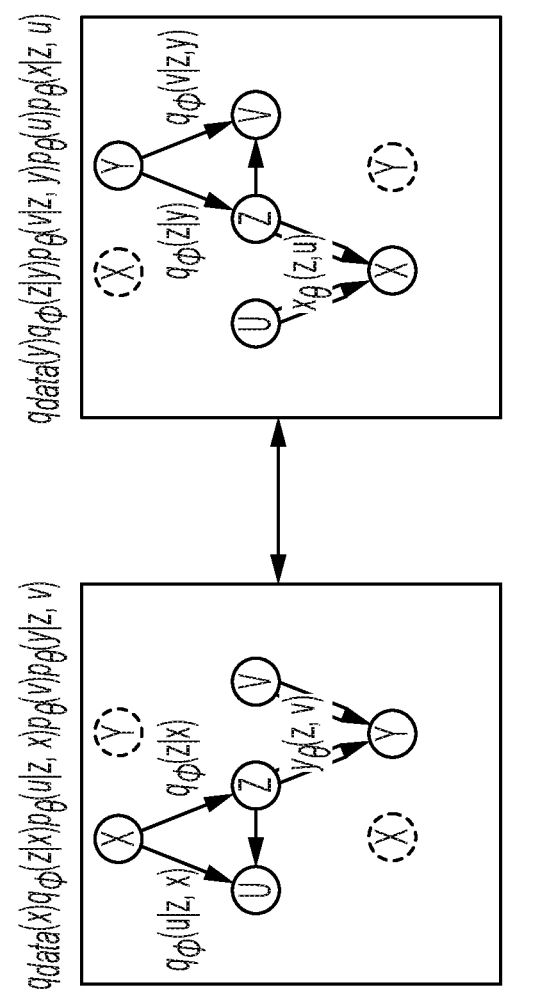
FIG. 3 is a relation diagram for a variational autoencoder, according to an embodiment of the present disclosure.

Joint distribution consistency (as illustrated in FIG. 3) may be used, with these two joint distributions, to yield the following two Kullback-Leibler (KL) divergence terms:

$$D_{KL}(p_{\phi,\theta}^{x \to y}(z,u,v,x,y)\|p_{\phi,\theta}^{y \to x}(z,u,v,x,y)) = D_{KL}(q_{data} \\ (x)q_\phi(z|x)p_\theta(u|z,x)p_\theta(v)p_\theta(y|z,v)\|q_{data}(y)q_\phi(z|y)p_\theta \\ (v|z,y)p_\theta(u)p(x|z,u))$$

$$D_{KL}(p_{\phi,\theta}^{y \to x}(z,u,v,x,y)\|p_{\phi,\theta}^{x \to y}(z,u,v,x,y)) = D_{KL}(q_{data} \\ (x)q_\phi(z|x)p_\theta(u|z,x)p_\theta(v)p_\theta(y|z,v)\|q_{data}(y)q_\phi(z|y)p_\theta \\ (v|z,y)p_\theta(u)p(x|z,u))$$

Pairs of (x,y) are not needed to evaluate $D_{KL}(p_{\phi,\theta}^{x \to y}(z,u,v,x,y)\|p_{\phi,\theta}^{y \to x}(z,u,v,x,y))$ or $D_{KL}(p_{\phi,\theta}^{y \to x}(z,u,v,x,y)\|p_{\phi,\theta}^{x \to y}(z,u,v,x,y))$ because the joint distribution $q_{data}(x,y)$ does not appear in these expressions.

Expanding the first KL divergence term results in the following loss function, which may be referred to as L_x:

$$E_{q_{data}(x)q_\phi(z|x)q_\phi(u|z,x)}\underbrace{[-\log p_\theta(x|z,u)]}_{(A)} +$$

$$E_{q_{data}(x)q_\phi(z|x)p_\theta(v)p_\theta(y|z,v)}\underbrace{\left[\log\frac{q_\phi(z|x)}{q_\phi(z|y)}\right]}_{(B)} +$$

$$E_{q_{data}(x)q_\phi(z|x)q_\phi(u|z,x)}\underbrace{\left[\log\frac{q_\phi(u|z,x)}{p_\phi(u)}\right]}_{(C)} +$$

$$E_{q_{data}(x)q_\phi(z|x)p_\theta(v)p_\theta(y|z,v)}\underbrace{\left[\log\frac{p_\phi(v)}{q_\phi(v|z,y)}\right]}_{(D)} +$$

$$E_{q_{data}(x)q_\phi(z|x)p_\theta(v)p_\theta(y|z,v)}\underbrace{\left[\log\frac{p_\theta(y|z,v)}{q_{data}(y)}\right]}_{(E)},$$

where h denotes entropy, and $$(B) = E_{q_{data}(x)q_\phi(z|x)p_\theta(v)p_\theta(y|z,v)}\left[\log\frac{q_\phi(z|x)}{q_\phi(z|y)}\right] =$$

$$-E_{q_{data}(x)q_\phi(z|x)p_\theta(v)p_\theta(y|z,v)}[\log q_\phi(z|y)] - E_{q_{data}(x)}[h_{q_\phi}(z|x)]$$

$$(C) = E_{q_{data}(x)q_\phi(z|x)q_\phi(u|z,x)}\left[\log\frac{q_\phi(u|z,x)}{p_\phi(u)}\right] =$$

$$E_{q_{data}(x)q_\phi(z|x)}[D_{KL}(q_\phi(u|z,x)\|p_\phi(u))]$$

$$(D) = E_{q_{data}(x)q_\phi(z|x)p_\theta(v)p_\theta(y|z,v)}\left[\log\frac{p_\theta(v)}{q_\phi(v|z,y)}\right] =$$

$$-E_{q_{data}(x)q_\phi(z|x)p_\theta(v)p_\theta(y|z,v)}[\log q_\phi(v|z,y)] - h_{p_\theta}(v)$$

$$(E) = E_{q_{data}(x)q_\phi(z|x)p_\theta(v)p_\theta(y|z,v)}\left[\log\frac{p_\theta(y|z,v)}{q_{data}(y)}\right] =$$

$$E_{q_{data}(x)}[D_{KL}(p_\theta(y|z,v)q_\phi(z|x)p_\theta(v)\|q_{data}(y)q_\phi(z|x)p_\theta(v))].$$

In the above expression, (A) is a reconstruction loss of x, e.g., mean-squared-error, (B) provides the consistency on z, i.e., we generate z(x) from x and generate y from z(x) and v, then the encoded z(y) from y should be close to the original z(x) from x, (C) provides the consistency on u, i.e., the distribution of u generated from z,x should match to the prior distribution of u, (D) provides the consistency on v, i.e., we generate y from z,v, then the encoded v(y,z) from y,z should be close to the original v, and (E) provides the consistency on y, i.e., if we generate z from x and generate y from z and v, then the generated y should follow the data distribution of y.

In terms (B) through (E), "consistency on" means a contribution to the loss function corresponding to a deviation from consistency.

An analogous expression, in which y and x are interchanged, may be referred to as L_y. The total loss function (or "first loss function") for training may then be given by L_x+L_y.

The last expectation (in term (E)) is not tractable because it contains $qaa_{ta}(Y)$ in the right hand side of the KL divergence. As such, a divergence estimation procedure may be used, as follows:

$$(E) = E_{q_{data}(x)}[D_{KL}(p_\theta(y\,|\,z,v)q_\theta(z\,|\,x)p_\theta(v)\|q_{data}(y)q_\phi(z\,|\,x)p_\theta(v))] =$$

$$E_{q_{data}(x)}\left[\sup_{T_\psi}\{E_{p_\theta(y|z,v)q_\phi(z|x)p_\theta(v)}[T_\psi(y)] - E_{q_{data}(y)q_\phi(z|x)p_\theta(v)}[f^*(T_\psi(y))]\}\right] \le$$

$$\sup_{T_\psi}\left\{E_{q_{data}(x)}\underbrace{\left[\begin{array}{l}E_{p_\theta(y|z,v)q_\phi(z|x)p_\theta(v)}[T_\psi(y)] - \\ E_{q_{data}(y)q_\phi(z|x)p_\theta(v)}[f^*(T_\psi(y))]\end{array}\right]}_{(F)}\right\}$$

For a KL divergence, $f^*(t)=\exp(t)-1$, and thus, it follows that $$(F)=E_{q_{data}}(x)[E_{p_\theta(y|z,v)}q_\phi(z|x)p_\theta(v)[T_\psi(y)] - E_{q_{data}(y)}q_\phi(z|x)p_\theta(v)[\exp(T_\psi(y))-1]]$$

Finally, a minimax optimization for θ, φ and ψ, as in generative adversarial network (GAN) training, may be used for minimization of the joint distribution KL divergence terms.

This joint distribution matching with unpaired data yields the following losses that may be computed as depicted in FIGS. 4A-4E. Each of the terms is illustrated with a separate drawing (from among FIGS. 4A-4E); in some embodiments, however, the training is performed by combining all of them into one combined loss function.

Figure 4A:
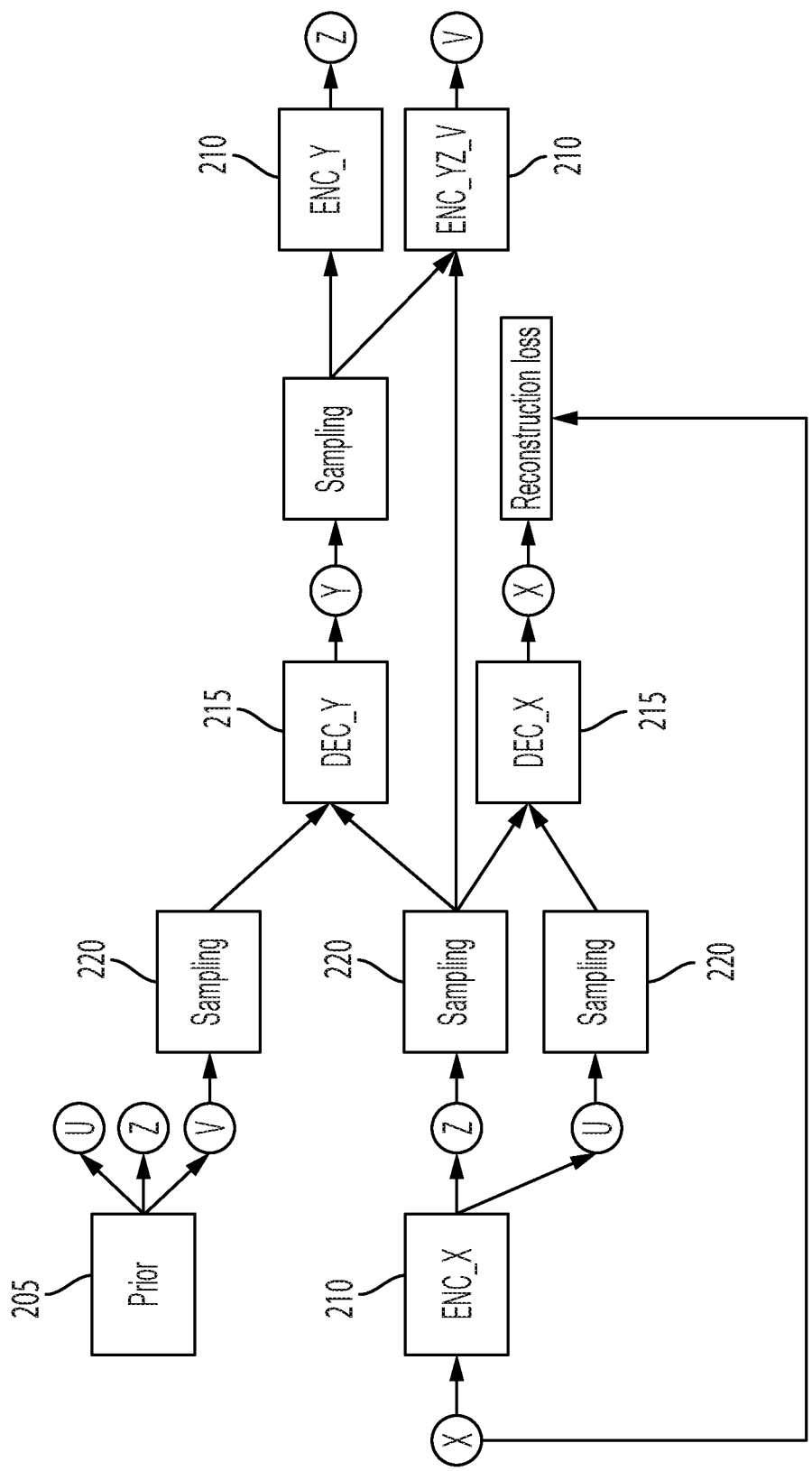
FIG. 4A is a block diagram showing a portion of the training of a variational autoencoder, according to an embodiment of the present disclosure.

FIG. 4A shows the training term for consistency on the X variable:

$$(A) = E_{q_{data}(x)q_\phi(z|x)q_\phi(u|z,x)}[-\log p_\theta(x|z,u)]$$

Figure 4B:
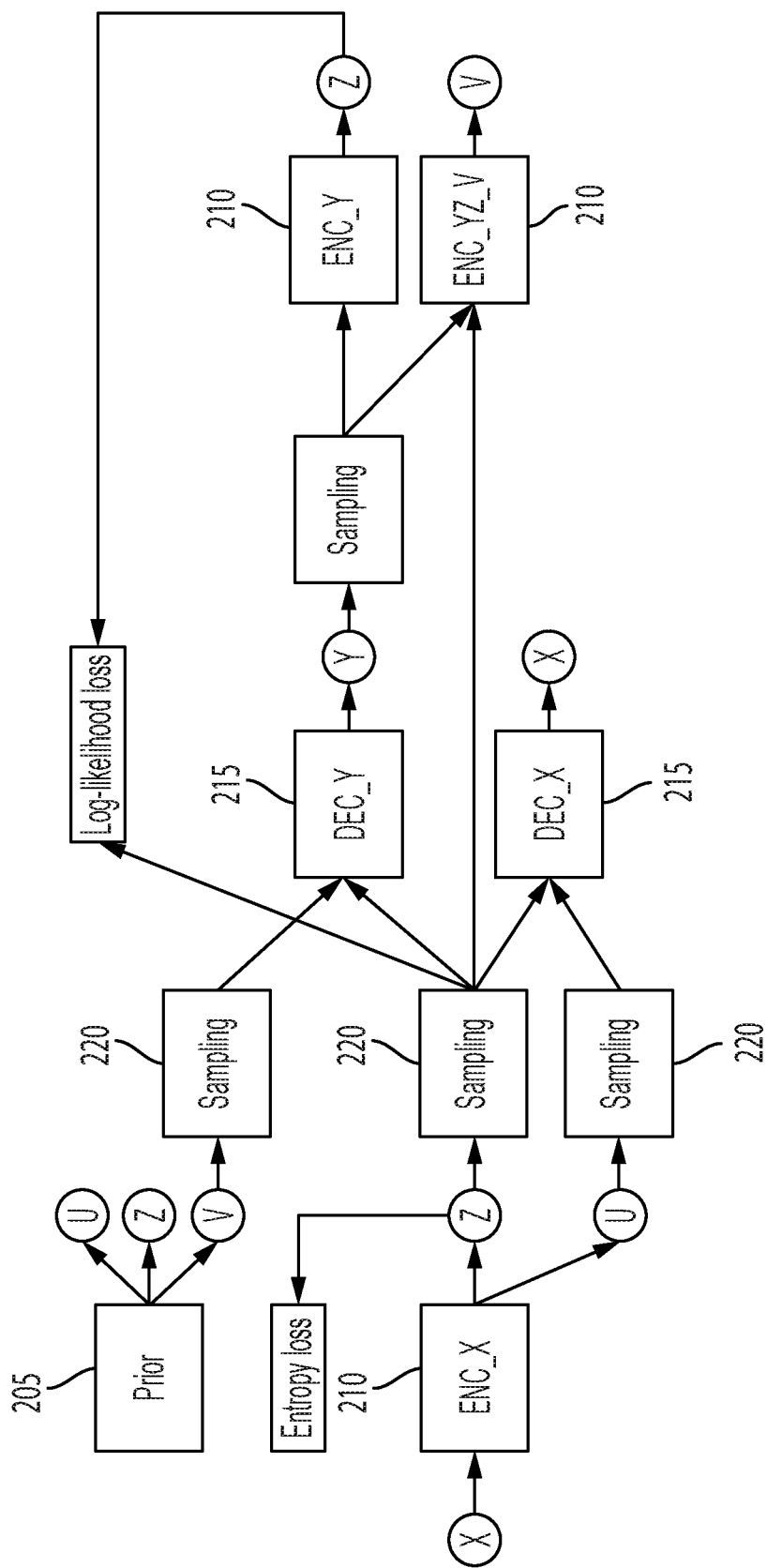
FIG. 4B is a block diagram showing a portion of the training of a variational autoencoder, according to an embodiment of the present disclosure.

FIG. 4B shows the training term for consistency on the Z variable:

$$(B) = E_{q_{data}(x)q_\phi(z|x)p_\theta(v)p_\theta(y|z,v)}\left[\log\frac{q_\phi(z\,|\,x)}{q_\phi(z\,|\,y)}\right] =$$

$$-E_{q_{data}(x)q_\phi(z|x)p_\theta(v)p_\theta(y|z,v)}[\log q_\phi(z\,|\,y)] - E_{q_{data}(x)}[h_{q_\phi}(z\,|\,x)]$$

Figure 4C:
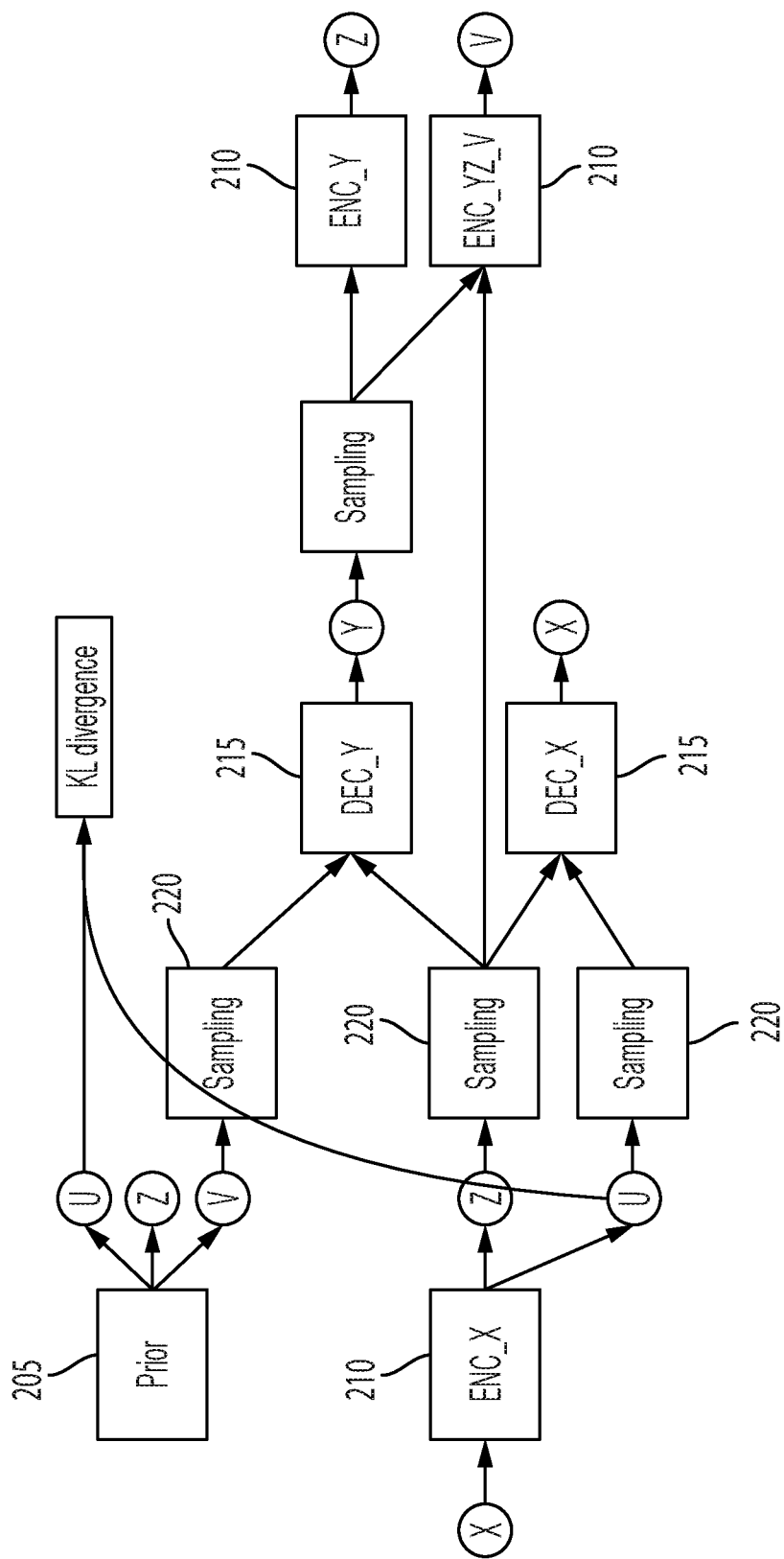
FIG. 4C is a block diagram showing a portion of the training of a variational autoencoder, according to an embodiment of the present disclosure.

FIG. 4C shows the training term for consistency on the U variable:

$$(C) = E_{q_{data}(x)q_\phi(z|x)p_\theta(v)p_\theta(y|z,v)}\left[\log\frac{q_\phi(z\,|\,x)}{p_\phi(u)}\right] =$$

$$E_{q_{data}(x)q_\phi(z|x)}[D_{KL}(q_\phi(u\,|\,z,x)\|p_\phi(u))]$$

Figure 4D:
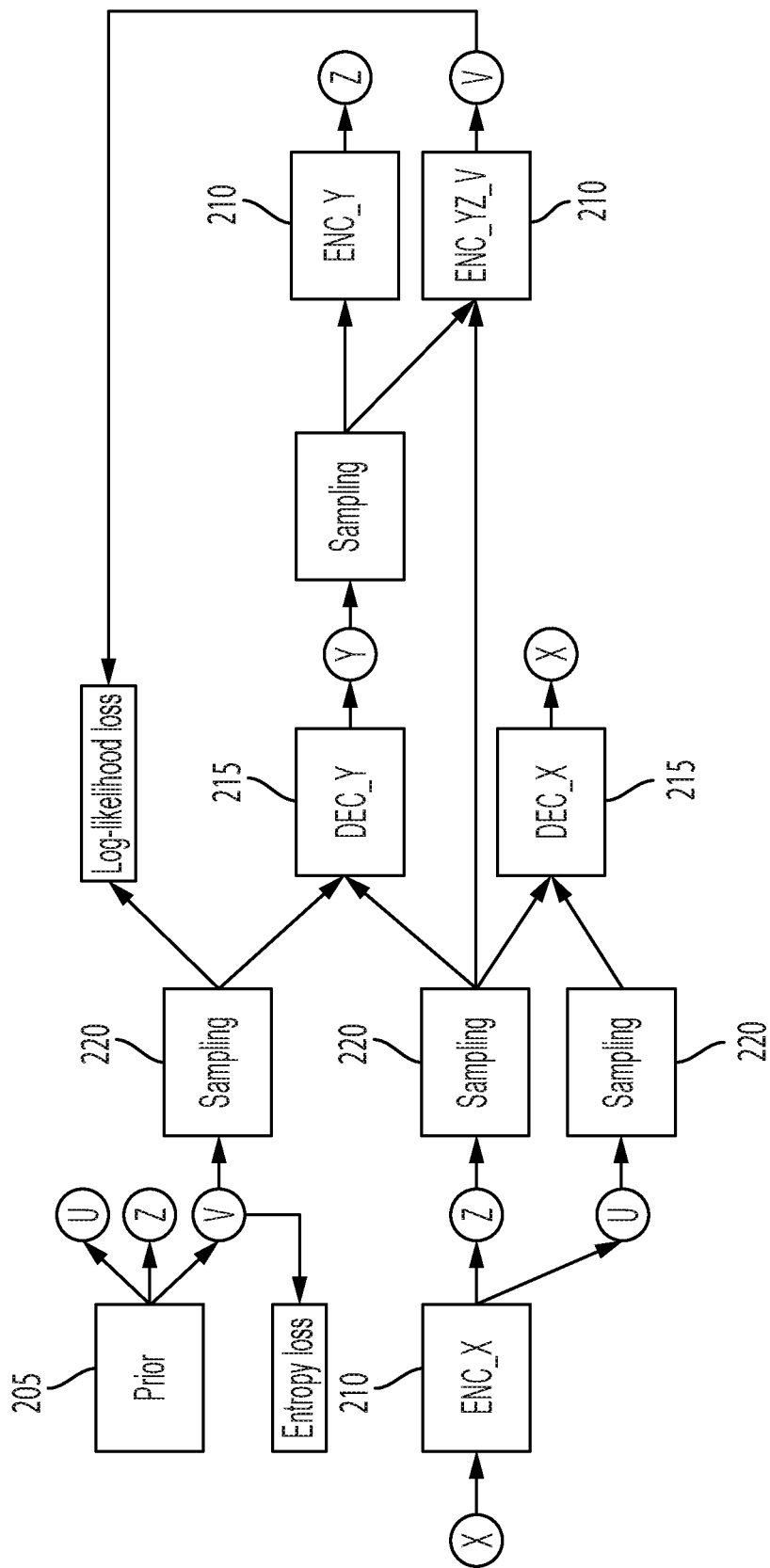
FIG. 4D is a block diagram showing a portion of the training of a variational autoencoder, according to an embodiment of the present disclosure.

FIG. 4D shows the training term for consistency on the V variable:

$$(D) = E_{q_{data}(x)q_\phi(z|x)p_\theta(v)p_\theta(y|z,v)}\left[\log\frac{p_\phi(v)}{q_\phi(v\,|\,z,y)}\right] =$$

$$-E_{q_{data}(x)q_\phi(z|x)p_\theta(v)p_\theta(y|z,v)}[\log q_\phi(z\,|\,y)] - h_{p_\theta}(v)$$

Figure 4E:
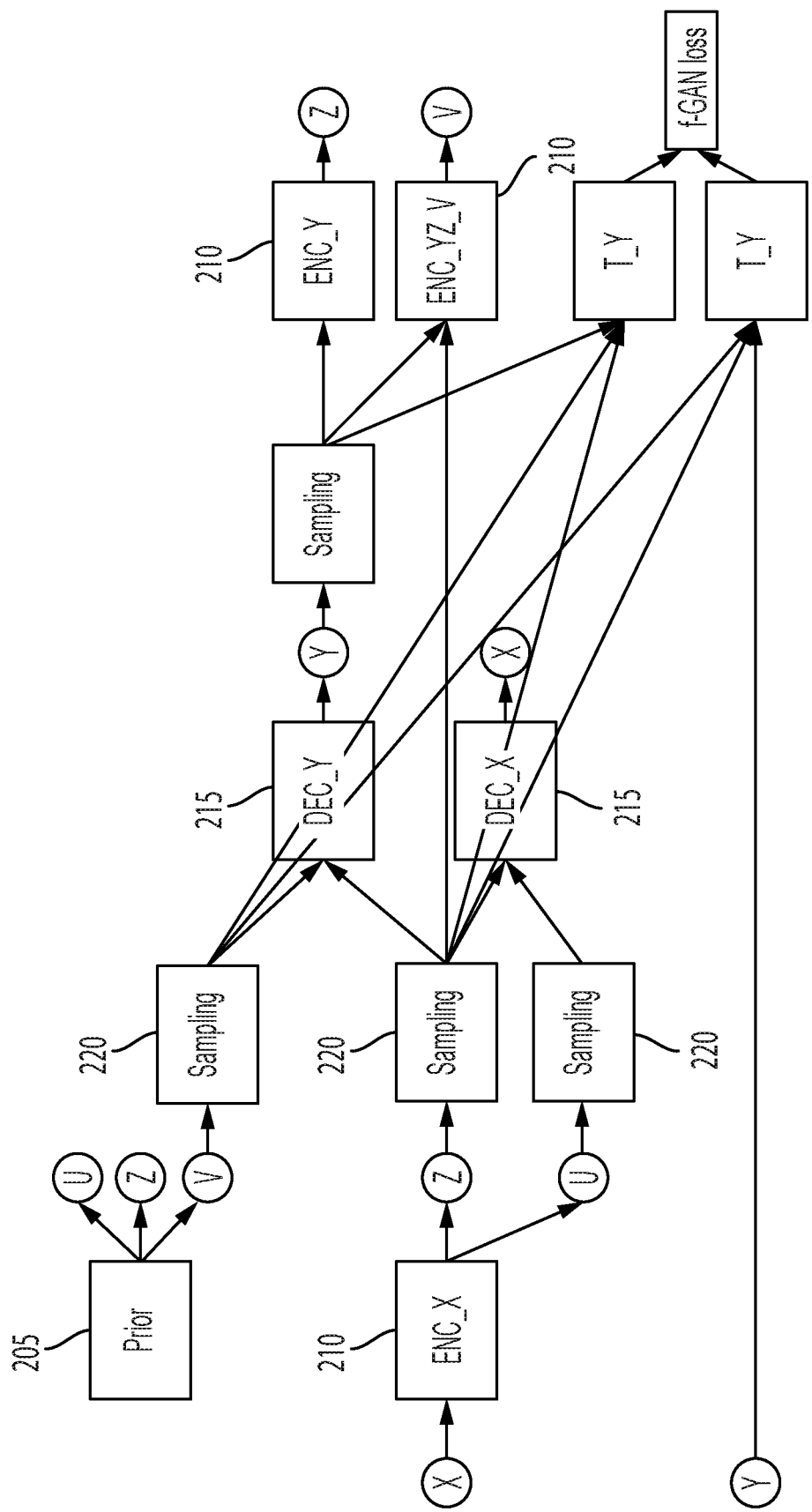
FIG. 4E is a block diagram showing a portion of the training of a variational autoencoder, according to an embodiment of the present disclosure.

FIG. 4E shows the training term for consistency on the Y variable:

$$(E) = E_{q_{data}(x)q_\phi(z|x)p_\theta(v)p_\theta(y|z,v)}\left[\log\frac{p_\theta(y\,|\,z,v)}{q_{data}(y)}\right] =$$

$$E_{q_{data}(x)}[D_{KL}(p_\theta(y\,|\,z,v)q_\phi(z\,|\,x)p_\theta(v)\|q_{data}(y)q_\phi(z\,|\,x)p_\theta(v))] =$$

$$E_{q_{data}(x)}\left[\sup_{T_\psi}\{E_{p_\theta(y|z,v)q_\phi(z|x)p_\theta(v)}[T_\psi(y)] - E_{q_{data}(y)q_\phi(z|x)p_\theta(v)}[f^*(T_\psi(y))]\}\right] \le$$

$$\sup_{T_\psi}\left\{E_{q_{data}(x)}\underbrace{\left[\begin{array}{l}E_{p_\theta(y|z,v)q_\phi(z|x)p_\theta(v)}[T_\psi(y)] - \\ E_{q_{data}(y)q_\phi(z|x)p_\theta(v)}[f^*(T_\psi(y))]\end{array}\right]}_{(F)}\right\}$$

The above term identified as (F) may be used as a loss function term L_T_x, which may be combined with an analogous loss function term L_T_y, in which y and x are interchanged, to form a total loss function (or "second loss function") L_T_x+L_T_y. This second loss function may be used to train the discriminative neural network, which, together with the variational autoencoder, forms a generative adversarial network (GAN) using an f-divergence (f-GAN).

In FIGS. 4A-4E, (i) the "Prior" block 205 represents a network that yields prior distributions of z, u, v, i.e., $p_\theta(z)$ $p_\theta(u)p_\theta(v)$, (ii) ENC_XY represents the encoder networks 210 that yield $q_\phi(z|x, y)q_\phi(u|z,x)q_\phi(v|z,y)$ (iii) DEC_X represents the decoder network 215 that yields $p_\theta(x|z,u)$ (iv) DEC_Y represents the decoder network 215 that yields $p_\theta(y|z,v)$, (v) each sampling block 220 generates one sample at a time from a respective given distribution, and (vi) T_Y is the network to discriminate the conditionally generated sample of Y from the data sample of Y.

Figure 5A:
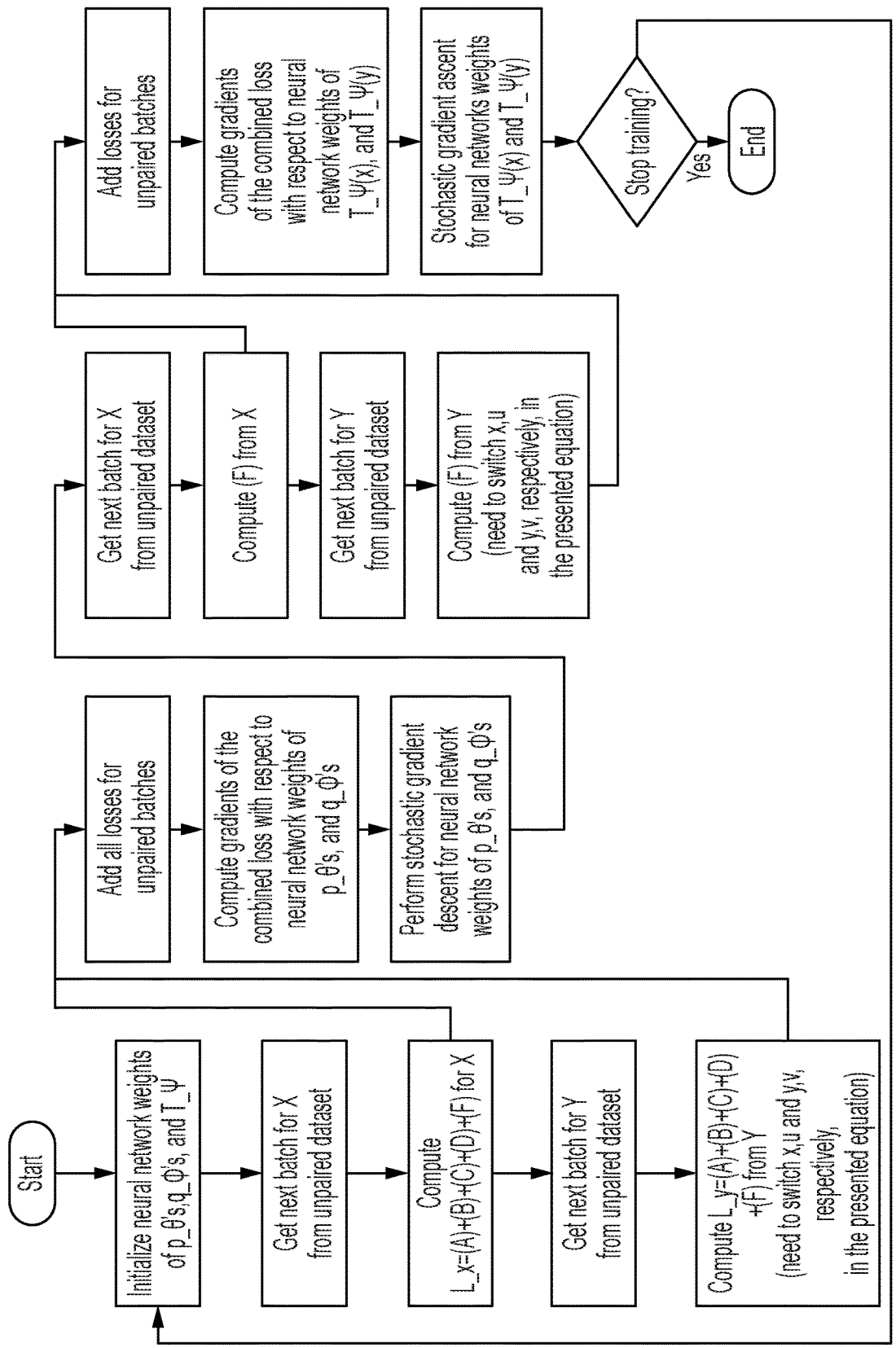
FIG. 5A is a flow chart of a method for training a variational autoencoder, according to an embodiment of the present disclosure.

To summarize, the training algorithm using only unpaired data X_unpaired, Y_unpaired may proceed as illustrated in the flowchart of FIG. 5A and in the following pseudocode listing:

---
Listing 1
---

```
For x_batch, y_batch from X_unpaired,Y_unpaired
    Using unpaired data X and Y
        Compute L_x=(A)+(B)+(C)+(D)+(F) from unpaired x_batch
        Compute L_y=(A)+(B)+(C)+(D)+(F) from unpaired y_batch
        Update encoder and decoder network weights θ,ϕ by minimizing L_x+L_y with
stochastic gradient descent (SGD)
        Compute L_T_x=(F) for unpaired x_batch
        Compute L_T_y=(F) for unpaired y_batch
        Update T_x,T_y network weights ψ by maximizing L_T_x+L_T_y with stochastic
gradient ascent (SGA)
```

---

Figure 5B:
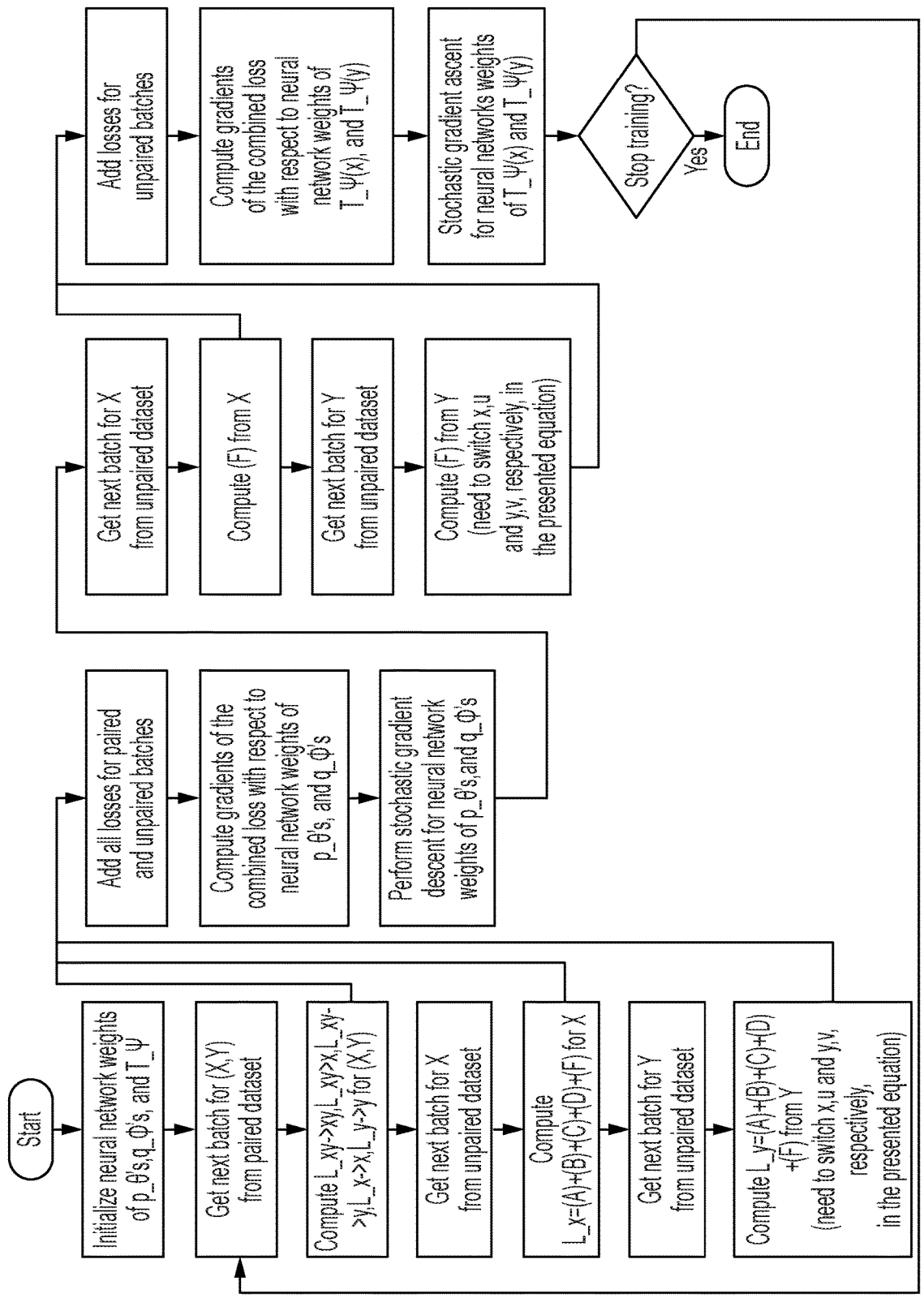
FIG. 5B is a flow chart of a method for training a variational autoencoder, according to an embodiment of the present disclosure.

The training algorithm using both paired data (X,Y) and unpaired data X_unpaired, Y_unpaired may proceed as illustrated in the flowchart of FIG. 5B and in the following pseudocode listing:

---
Listing 2
---

```
For xy_batch, x_batch, y_batch from (X,Y), X_unpaired, Y_unpaired
    Using paired data (X,Y)
        Compute the losses L_(xy→xy),L_(xy→x),L_(xy→y) L_(x→x),L_(y→y),l_q from paired
xy_batch
        Update encoder and decoder network weights θ,ϕ by stochastic gradient descent
(SGD) to minimize Eq~(6)
    Using unpaired data X and Y
        Compute L_x=(A)+(B)+(C)+(D)+(F) from unpaired x_batch
        Compute L_y=(A)+(B)+(C)+(D)+(F) from unpaired y_batch
        Update encoder and decoder network weights θ,ϕ by minimizing L_x+L_y with SGD
        Compute L_T_x=(F) for unpaired x_batch
        Compute L_T_y=(F) for unpaired y_batch
        Update T_x,T_y network weights ψ by maximizing L_T_x+L_T_y with stochastic
gradient ascent (SGA)
```

---

Figure 6:
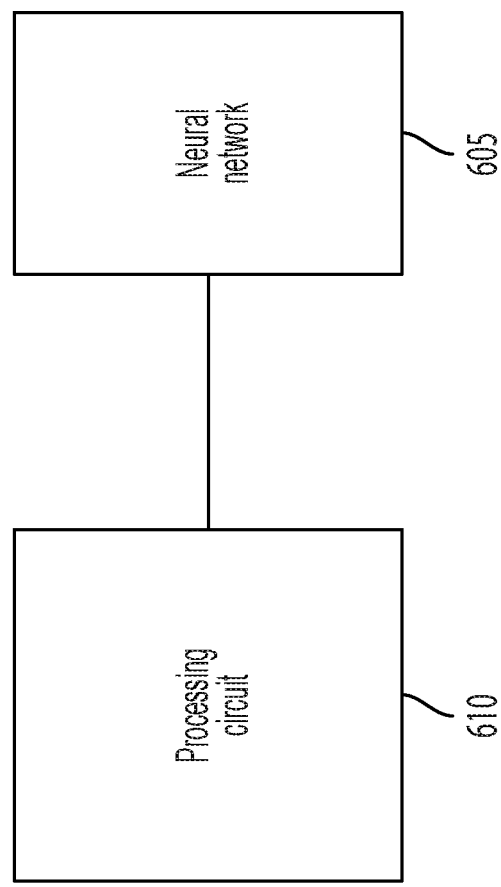
FIG. 6 is a block diagram of a system including a neural network, according to an embodiment of the present disclosure.

The neural network (which may include the variational autoencoder and the discriminative neural network) may be implemented in a digital circuit (e.g., a processing circuit, discussed in further detail below) or it may be implemented as an analog circuit. As shown in FIG. 6, the neural network 605 may be connected to (or, equivalently, if it is a digital neural network, be part of) a processing circuit 610. In such a configuration the processing circuit 610 may manage the operation of the neural network, configuring it for training, for conditional generation, or for joint generation, and feeding it data.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

As used herein, the term "array" refers to an ordered set of numbers regardless of how stored (e.g., whether stored in consecutive memory locations, or in a linked list). As used herein, when a first quantity (e.g., a first value) is referred to as being "based on" a second quantity (e.g., a second value) it means that the second quantity influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

As used herein, when a second number is "within Y %" of a first number, it means that the second number is at least $(1-Y/100)$ times the first number and the second number is at most $(1+Y/100)$ times the first number.

As used herein, when a method (e.g., an adjustment) or a first quantity (e.g., a first matrix) is referred to as being "based on" a second quantity (e.g., a second matrix) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for learning stochastic inference models between multiple random variables with unpaired data have been specifically described and illustrated herein, many modifications and variations will be apparent to those skilled in the art. Accordingly, it is to be understood that a system and method for learning stochastic inference models between multiple random variables with unpaired data constructed according to principles of this disclosure may be embodied other than as specifically described herein. The invention is also defined in the following claims, and equivalents thereof.

What is claimed is:

1. A method for operating a neural network, the method comprising:
    training the neural network,
    wherein:
        the neural network comprises a variational autoencoder, comprising:
            an encoder network configured:
                to receive a sample of a first random variable, and to produce a mean and a variance of each of: a first latent variable and a second latent variable, or
                to receive a sample of a second random variable, and to produce a mean and a variance of each of: the second latent variable and a third latent variable; and
            a decoder network configured:
                to receive a sample of the first latent variable and a sample of the second latent variable, and to generate a generated sample of the first random variable, or
                to receive a sample of the second latent variable and a sample of the third latent variable, and to generate a generated sample of the second random variable,
        the training of the neural network comprising training the variational autoencoder with:
            a plurality of samples of the first random variable; and
            a plurality of samples of the second random variable,
        the plurality of samples of the first random variable and the plurality of samples of the second random variable being unpaired,
        the training of the neural network comprising updating weights in the neural network based on a first loss function, the first loss function being based on a measure of deviation from consistency between:
            a conditional generation path from the first random variable to the second random variable, and
            a conditional generation path from the second random variable to the first random variable.

2. The method of claim 1, wherein the first loss function includes:
    a first term representing reconstruction loss of the first random variable;
    a second term representing deviations from consistency in the second latent variable;
    a third term representing deviations from consistency in the first latent variable; and
    a fourth term representing deviations from consistency in the third latent variable.

3. The method of claim 1, further comprising performing conditional generation, by the variational autoencoder, the performing of conditional generation comprising:
    receiving, by the encoder network, a sample of the first random variable;
    producing a mean and a variance of each of: the first latent variable and the second latent variable;
    receiving, by the decoder network, a sample of each of:
        a distribution having the produced mean and the produced variance of the first latent variable,
        a distribution having the produced mean and the produced variance of the second latent variable, and
        a distribution having the mean and the variance of a prior distribution of the third latent variable; and generating, by the decoder network, a generated sample of the second random variable.

4. The method of claim 1, further comprising performing joint generation, by the variational autoencoder, the performing of joint generation comprising:
receiving, by the decoder network, a sample of each of:
the first latent variable,
the second latent variable, and
the third latent variable; and
generating, by the decoder network:
a generated sample of the first random variable, based on the first latent variable and the second latent variable,
a generated sample of the second random variable, based on the second latent variable and the third latent variable.

5. The method of claim 1, wherein the neural network further comprises a discriminative neural network, and the training of the neural network further comprises updating weights in the discriminative neural network based on a second loss function, the second loss function comprising an f-divergence.

6. The method of claim 5, wherein the training comprises updating weights in the neural network based on a first loss function, the first loss function including:
a first term representing reconstruction loss of the first random variable;
a second term representing deviations from consistency in the second latent variable;
a third term representing deviations from consistency in the first latent variable; and
a fourth term representing deviations from consistency in the third latent variable.

7. The method of claim 6, wherein the first loss function further includes a fifth term based on the discriminative neural network.

8. The method of claim 7, further comprising performing conditional generation, by the variational autoencoder, the performing of conditional generation comprising:
receiving, by the encoder network, a sample of the first random variable;
producing a mean and a variance of each of: the first latent variable and the second latent variable;
receiving, by the decoder network, a sample of each of:
a distribution having the produced mean and the produced variance of the first latent variable,
a distribution having the produced mean and the produced variance of the second latent variable, and
a distribution having the mean and the variance of a prior distribution of the third latent variable; and
generating, by the decoder network, a generated sample of the second random variable.

9. The method of claim 7, further comprising performing joint generation, by the variational autoencoder, the performing of joint generation comprising:
receiving, by the decoder network, a sample of each of:
the first latent variable,
the second latent variable, and
the third latent variable; and
generating, by the decoder network:
a generated sample of the first random variable, based on the first latent variable and the second latent variable,
a generated sample of the second random variable, based on the second latent variable and the third latent variable.

10. A system, comprising:
a processing circuit, and
a neural network,
the processing circuit being configured to train the neural network,
wherein:
the neural network comprises a variational autoencoder, comprising:
an encoder network configured:
to receive a sample of a first random variable, and to produce a mean and a variance of each of: a first latent variable and a second latent variable, or
to receive a sample of a second random variable, and to produce a mean and a variance of each of: the second latent variable and a third latent variable; and
a decoder network configured:
to receive a sample of the first latent variable and a sample of the second latent variable, and to generate a generated sample of the first random variable, or
to receive a sample of the second latent variable and a sample of the third latent variable, and to generate a generated sample of the second random variable,
the training of the neural network comprising training the variational autoencoder with:
a plurality of samples of the first random variable; and
a plurality of samples of the second random variable,
the plurality of samples of the first random variable and the plurality of samples of the second random variable being unpaired,
the training of the neural network comprising updating weights in the neural network based on a first loss function, the first loss function being based on a measure of deviation from consistency between:
a conditional generation path from the first random variable to the second random variable, and
a conditional generation path from the second random variable to the first random variable.

11. The system of claim 10, wherein the first loss function includes:
a first term representing reconstruction loss of the first random variable;
a second term representing deviations from consistency in the second latent variable;
a third term representing deviations from consistency in the first latent variable; and
a fourth term representing deviations from consistency in the third latent variable.

12. The system of claim 10, wherein the processing circuit is configured to cause the variational autoencoder to perform conditional generation, the performing of conditional generation comprising:
receiving, by the encoder network, a sample of the first random variable;
producing a mean and a variance of each of: the first latent variable and the second latent variable;
receiving, by the decoder network, a sample of each of:
a distribution having the produced mean and the produced variance of the first latent variable, a distribution having the produced mean and the produced variance of the second latent variable, and a distribution having the mean and the variance of a prior distribution of the third latent variable; and generating, by the decoder network, a generated sample of the second random variable.

13. The system of claim 10, wherein the processing circuit is configured to cause the variational autoencoder to perform joint generation, the performing of joint generation comprising:

receiving, by the decoder network, a sample of each of:
the first latent variable,
the second latent variable, and
the third latent variable; and generating, by the decoder network:
a generated sample of the first random variable, based on the first latent variable and the second latent variable,
a generated sample of the second random variable, based on the second latent variable and the third latent variable.

14. The system of claim 10, wherein the neural network further comprises a discriminative neural network, and the training of the neural network further comprises updating weights in the discriminative neural network based on a second loss function, the second loss function comprising an f-divergence.

15. The system of claim 14, wherein the training comprises updating weights in the neural network based on a first loss function, the first loss function including:

a first term representing reconstruction loss of the first random variable;

a second term representing deviations from consistency in the second latent variable;

a third term representing deviations from consistency in the first latent variable; and a fourth term representing deviations from consistency in the third latent variable.

16. The system of claim 15, wherein the first loss function further includes a term based on the discriminative neural network.

17. The system of claim 16, wherein the processing circuit is configured to cause the variational autoencoder to perform conditional generation, the performing of conditional generation comprising:

receiving, by the encoder network, a sample of the first random variable;

producing a mean and a variance of each of: the first latent variable and the second latent variable;

receiving, by the decoder network, a sample of each of:
a distribution having the produced mean and the produced variance of the first latent variable,
a distribution having the produced mean and the produced variance of the second latent variable, and
a distribution having the mean and the variance of a prior distribution of the third latent variable; and generating, by the decoder network, a generated sample of the second random variable.

18. The system of claim 16, wherein the processing circuit is configured to cause the variational autoencoder to perform joint generation, the performing of joint generation comprising:

receiving, by the decoder network, a sample of each of:
the first latent variable,
the second latent variable, and
the third latent variable; and generating, by the decoder network:
a generated sample of the first random variable, based on the first latent variable and the second latent variable,
a generated sample of the second random variable, based on the second latent variable and the third latent variable.

19. A system, comprising:

means for processing, and a neural network, the means for processing being configured to train the neural network, wherein:
the neural network comprises a variational autoencoder, comprising:
an encoder network configured:
to receive a sample of a first random variable, and to produce a mean and a variance of each of: a first latent variable and a second latent variable, or
to receive a sample of a second random variable, and to produce a mean and a variance of each of: the second latent variable and a third latent variable; and a decoder network configured:
to receive a sample of the first latent variable and a sample of the second latent variable, and to generate a generated sample of the first random variable, or
to receive a sample of the second latent variable and a sample of the third latent variable, and to generate a generated sample of the second random variable, the training of the neural network comprising training the variational autoencoder with:
a plurality of samples of the first random variable; and
a plurality of samples of the second random variable,
the plurality of samples of the first random variable and the plurality of samples of the second random variable being unpaired, the training of the neural network comprising updating weights in the neural network based on a first loss function, the first loss function being based on a measure of deviation from consistency between:
a conditional generation path from the first random variable to the second random variable, and
a conditional generation path from the second random variable to the first random variable.

20. The system of claim 19, wherein the first loss function includes:

a first term representing reconstruction loss of the first random variable;

a second term representing deviations from consistency in the second latent variable;

a third term representing deviations from consistency in the first latent variable; and a fourth term representing deviations from consistency in the third latent variable.

\* \* \* \* \*